United States Patent
Hohner et al.

[19]

[11] Patent Number: 6,155,241
[45] Date of Patent: Dec. 5, 2000

[54] METHOD FOR IDENTIFYING KNOCKING COMBUSTION IN AN INTERNAL COMBUSTION ENGINE WITH AN ALTERNATING CURRENT IGNITION SYSTEM

[75] Inventors: Peter Hohner, Echterdingen; Jens Schirmer, Eckental, both of Germany

[73] Assignee: Daimler-Benz Aktiengesellschaft, Stuttgart, Germany

[21] Appl. No.: 09/214,903
[22] PCT Filed: May 2, 1998
[86] PCT No.: PCT/EP98/02605
  § 371 Date: Jan. 15, 1999
  § 102(e) Date: Jan. 15, 1999
[87] PCT Pub. No.: WO98/53198
  PCT Pub. Date: Nov. 26, 1998

[30] Foreign Application Priority Data

May 16, 1997 [DE] Germany ............................ 197 20 535

[51] Int. Cl.[7] .............................. F02P 17/12; G01L 23/22
[52] U.S. Cl. ............... 123/625; 123/406.24; 123/406.37; 73/117.3; 73/35.08
[58] Field of Search ....................................... 123/625, 644, 123/406.24, 406.13, 406.14, 406.34, 406.37; 73/115, 117.3, 35.08

[56] References Cited

U.S. PATENT DOCUMENTS

| | | | |
|---|---|---|---|
| 4,365,186 | 12/1982 | Gerry ........................................ | 123/620 |
| 4,406,273 | 9/1983 | Yoshinaga et al. ...................... | 123/625 |
| 4,608,855 | 9/1986 | Blauhut ................................... | 73/35.08 |
| 5,247,919 | 9/1993 | Akaki et al. ............................. | 123/625 |
| 5,505,175 | 4/1996 | Mai et al. ................................ | 123/417 |
| 5,758,629 | 6/1998 | Bahr et al. ............................... | 123/644 |
| 5,781,012 | 7/1998 | Yasuda .................................... | 324/399 |
| 5,914,604 | 6/1999 | Bahr et al. ............................... | 324/399 |

FOREIGN PATENT DOCUMENTS

| | | |
|---|---|---|
| 0654604A1 | 5/1995 | European Pat. Off. . |
| 33 27 766 A1 | 2/1985 | Germany . |
| 4409749A1 | 9/1995 | Germany . |
| 195 24 540 C1 | 6/1996 | Germany . |
| 195 24 539 C1 | 11/1996 | Germany . |
| 195 24 541 C1 | 12/1996 | Germany . |
| 19614287C1 | 6/1997 | Germany . |

Primary Examiner—Henry C. Yuen
Assistant Examiner—Hieu T. Vo
Attorney, Agent, or Firm—Venable; George H. Spencer; Norman N. Kunitz

[57] ABSTRACT

A method for determining knocking combustion in an internal combustion engine having an alternating current ignition system, which method is used to control the duration of the ignition spark burning time as well as the ignition energy while the fuel-air-mixture is ignited by the spark plug, in dependence on the load condition and other characteristic values provided by the engine.

4 Claims, 3 Drawing Sheets

METHOD FOR IDENTIFYING KNOCKING COMBUSTION IN AN INTERNAL COMBUSTION ENGINE WITH AN ALTERNATING CURRENT IGNITION SYSTEM

The invention relates to a method for determining knocking combustion in an internal combustion engine, as disclosed in the reference DE 44 09 749 A1.

Knocking combustion develops as a result of excessively high maximum pressures in the combustion chambers of the internal combustion engine, which cause an increase in the temperature of the unburnt fuel-air-mixture and lead toself-ignition of the fuel-air-mixture. These excessively high maximum pressures in the combustion chambers occur most often when the internal combustion engine is operating at full load.

In order to determine knocking combustion, the pressure development inside the combustion chamber is detected for all combustion chambers of the internal combustion engine by means of an ion current measurement. An ion current measurement technique is known, for example, from the reference DE 33 27 766 A1. According to this technique, knocking combustion can be determined through the occurrence of pressure peaks and fluctuations in the combustion chamber pressure development. For this, an alternating current is supplied immediately after the ignition of the fuel-air-mixture via the ignition coil to the spark plug which simultaneously functions as ion current probe. During the combustion of the fuel-air-mixture, this alternating current is modulated by ions in dependence on the pressure inside the combustion chamber. The modulated alternating current is then supplied to an evaluation circuit.

An ion current measurement is not possible during the ignition of the fuel-air-mixture by the spark plug. It is therefore necessary to reduce the spark burning time of the spark plug to a minimum in order to detect the combustion chamber pressure development immediately afterwards and to determine a possible knocking combustion.

The requirement for a short spark burning time at the spark plug is aided by the easy flammability of the fuel-air-mixture when the internal combustion engine is operating at full load. In addition, the rate of residual gas remaining in the combustion chambers from the preceding operating cycle is low during the full-load operation of the internal combustion engine, which could counter an easy flammability of the fuel-air-mixture.

In the partial load range, the power output of an internal combustion engine is controlled with a throttle valve. If the throttle valve closes, the combustion chamber receives less fuel-air-mixture, which in turn reduces the power output of the internal combustion engine. Owing to the lower amount of fuel, the combustion chamber pressure development during the operating cycle clearly shows lower maximum pressures. In addition, the rate of residual gas remaining in the cylinder from the preceding operating cycle increases. If an exhaust gas mixture from the combustion is additionally fed via an external combustion gas return-flow line to the fuel-air-mixture for a throttle release of the internal combustion engine, then the fuel-air-mixture in the combustion chamber requires a high ignition energy and a long spark burning time for a safe ignition.

The requirement for a long spark burning time for the partial load operation is met in that the maximum pressures in the combustion chamber pressure development are clearly lower than for the full-load operation of the internal combustion engine. That is the reason why an ion current measurement to detect knocking combustion can be omitted for the partial-load operation in the lower range. The spark burning time of the spark plug, if necessary, can extend over the complete operating cycle.

The feature according to which the required spark burning time of the spark plugs during the partial load operation and the necessity of conducting an ion measurement during the full-load operation complement each other positively during the operating cycle, as concerns the distribution of the available time, has already been described in the above-mentioned generic reference DE 44 09 7 49 A1. It was suggested in this reference that the ion-current detecting device be combined with a high-voltage transistor coil ignition device, thereby providing the option of realizing particularly long spark burning time times for the spark plugs which can be limited, e.g. by short-circuiting the secondary circuit of the ignition coil.

This method has the disadvantage that for each operating cycle the ignition coil is charged with the energy needed for a long spark burning time of the spark plug and that a high share of the energy is destroyed when limiting the spark burning time, thus requiring unnecessarily large dimensions for the high-voltage transistor coil ignition device.

It is the object of the invention to specify a method for detecting knocking combustion in an internal combustion engine having an ion current measurement device and an ignition device, which method utilizes the available time interval during the operating cycle in the partial load operation for the spark burning time of the spark plugs and in the full load operation for the ion current measurement and which supplies just enough energy via the ignition coil to the spark plugs as is needed for a secure ignition of the fuel-air-mixture, depending on the load.

SUMMARY OF THE INVENTION

The solution according to the invention is that the spark burning time and the ignition energy of the ignition spark for the spark plug during an ignition process are controlled by an ignition device that is designed as an alternating current ignition system, on the basis of the load condition of the internal combustion engine and additional characteristic engine values that are available. A control device is used to determine the optimum ignition energies and ignition intervals. The ignition energy of the spark plug spark is controlled in that a reference voltage at the control input of the alternating current ignition system, which is preset by the control device, is compared for an ignition operation of a spark plug to determine whether it coincides with the voltage dropping at a measuring resistor.

The higher the reference voltage level at the control input of the alternating current ignition system, the longer the ignition transistor of the alternating current ignition system remains conducting, the longer the ignition coil is charged and the higher the increase in the primary coil current, until the voltage dropping at the measuring resistor is equal to the reference voltage. The spark burning time of the ignition spark at the plug is controlled by the time interval during which a reference voltage is present at the control input of the alternating current ignition system, which reference voltage is higher than the minimum requirement in order to generate an ignition voltage on the secondary side of the ignition coil that is sufficiently high for allowing a spark to develop at the spark plug.

One advantageous modification of the invention provides that the ion current measurement is carried out to detect combustion ignition failures, wherein no ion current signal is detected at the end of the spark burning time if the fuel-air-mixture is not ignited.

Another advantageous embodiment according to the invention provides that the frequency for the alternating current ignition system is respectively adapted to the requirements that must be met for igniting the fuel-air-mixture and the ion-current measurement. Such circuit arrangements for the ion-current measurement and the alternating-current ignition of the internal combustion engine are described in the references DE 196 142 87 and DE 196 14 288 without prior publication.

According to the method for detecting knocking combustion in an internal combustion engine with an alternating current ignition system, the ignition coil in each case is charged with only enough energy from the electrical system component of the ignition system as is needed to maintain the ignition spark for the spark plug for the following half amplitude of the alternating ignition current on the secondary side of the ignition coil. For an ignition spark with short burning time, energy is not converted unnecessarily to heat in that case.

In the following, the method according to the invention for detecting knocking combustion in an internal combustion engine with an ignition system is illustrated and explained with the aid of an exemplary embodiment and in connection with three figures.

DETAILED DESCRIPTION OF THE PREFERRED EMBODIMENTS

Figure 1:
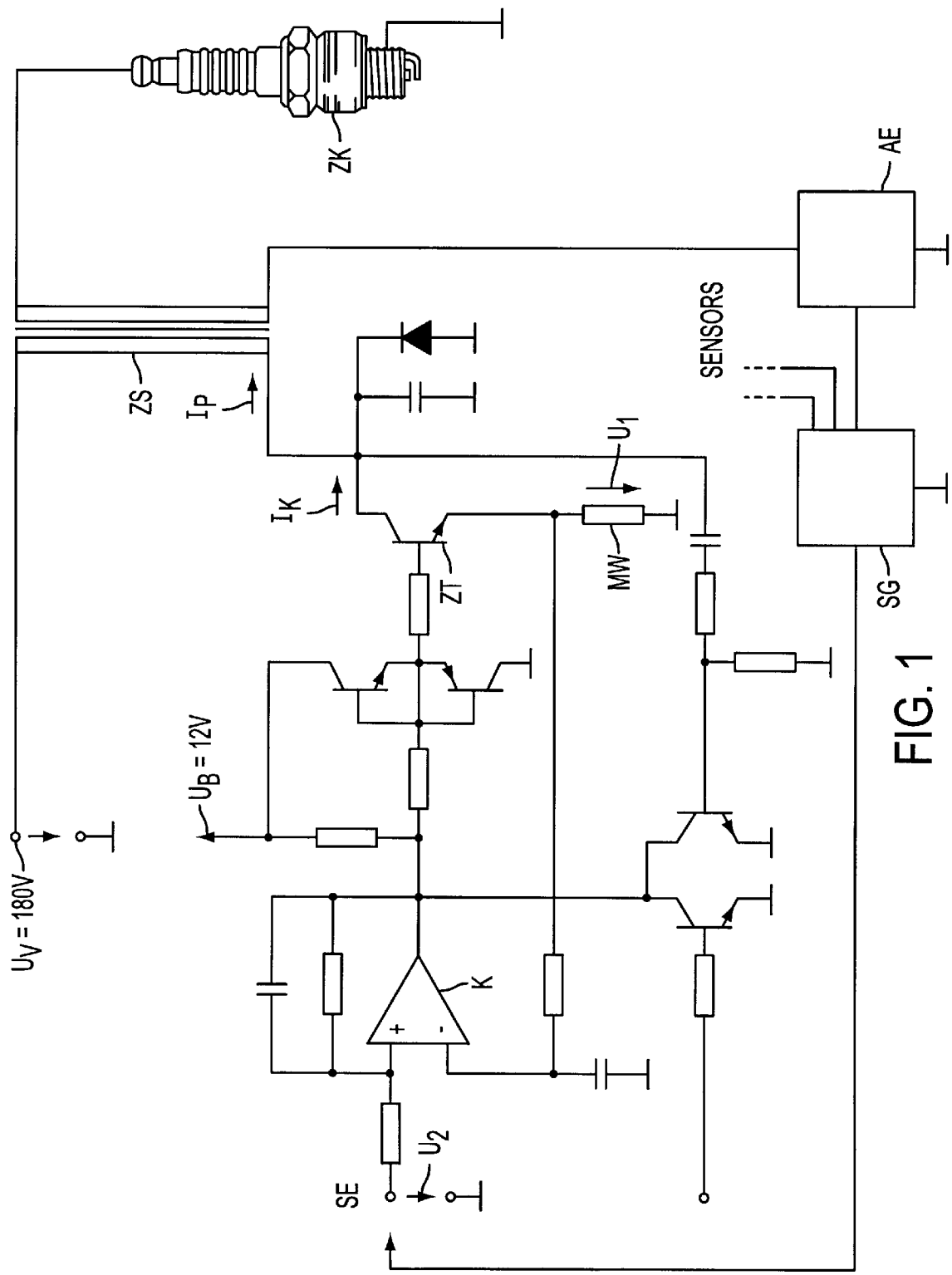
FIG. 1 is a basic wiring diagram for an alternating current ignition system having an ion current measurement device.

The FIG. 1 shows the basic wiring diagram for an alternating current ignition system with an ion current measurement device, wherein only one ignition stage with a spark plug ZK is shown for reasons of simplicity. With multi-cylinder internal combustion engines, it is possible to use specific components of the depicted alternating current ignition system jointly for all cylinders because of the sequential triggering of spark plugs ZK. Thus, in particular the measuring resistor MW can be used jointly for all cylinders.

The reference voltages U2 at the control input SE of the alternating current ignition system are generated and provided by a control device SG on the basis of characteristic values provided by the engine. Mainly, these include the load condition, the speed and the combustion gas return rate of the internal combustion engine.

The load condition of the internal combustion engine is predetermined by the position of the throttle valve (in general: the internal combustion engine component which has a throttling effect) in the fuel-air intake component. The throttle valve is opened only slightly for the lower partial load operation of the internal combustion engine, whereas it is halfway open for the mean partial load operation and approximately two-thirds open for the upper partial load operation it is. The full load operation refers to a load condition of the internal combustion engine where the throttle valve is fully opened. Of course, the transitions for the load-depending effects during a load change are fluid.

For the lower partial load operation of the internal combustion engine, the combustion chambers are filled via the partially closed throttle valve with a small amount of the available fuel-air-mixture. The pressure development in the combustion chamber, which results from the partially filled combustion chambers, clearly shows very low maximum pressures, as compared to the full-load operation. As a result, the fuel-air-mixture does not heat up as strongly during compression in the compression cycle, so that a knocking combustion does not develop. An ion current measurement for detecting knocking combustion is thus not necessary in the lower partial load range. As a result, the total time available during the operating cycle is available for igniting the fuel-air-mixture with the aid of the spark plug ZK.

The combustion process in the lower and mean partial load operation is influenced by the fact that the total amount of gas inside the combustion chambers following the intake cycle contains a high rate of residual gas from the preceding operating cycle that has remained in the combustion chambers, which counters an easy flammability of the fuel-air-mixture.

In addition, the internal combustion engine is operated with high rates of returned exhaust gas, for which the fuel-air-mixture in the intake duct is additionally enriched with a non-combustible gas mixture. As a result of this, the throttle valve inside the intake duct can be opened further, thereby causing less resistance to the sucked-in fuel-air-mixture. It is therefore necessary to have a high primary coil current and a long spark burning time for a reliable ignition of the fuel mixture.

For this, the control input SE of the alternating current ignition system is triggered by the control device SG with a high reference voltage $U2_1$, to which level the voltage U1 that drops at the measuring resistor MW must rise before the comparator K of the alternating current ignition system determines that U1 and U2 are equal and the ignition transistor ZT is closed. In the process, a high primary coil current lpr flows through the ignition coil ZS and induces a high secondary coil current of approximately 30000 Volt in its secondary circuit, causing a high-energetic ignition spark to develop at the spark plug ZK. Following the spark ignition, the ignition energy for maintaining the ignition spark can be reduced for the following amplitudes of the same ignition operation. For this, the control input SE of the alternating current ignition system is triggered with a lower, second reference voltage $U2_2$. The time interval required by the voltage U1 that drops at the measuring resistor MW for reaching the value of the second reference voltage $U2_2$ is consequently shortened and the ignition transistor ZT is closed. Accordingly, a lower primary coil current lpr flows through the ignition coil ZS and induces a lower secondary coil voltage of approximately 10000 Volt in its secondary circuit, as a result of which the ignition energy of the ignition spark is correspondingly lower.

Figure 2A:
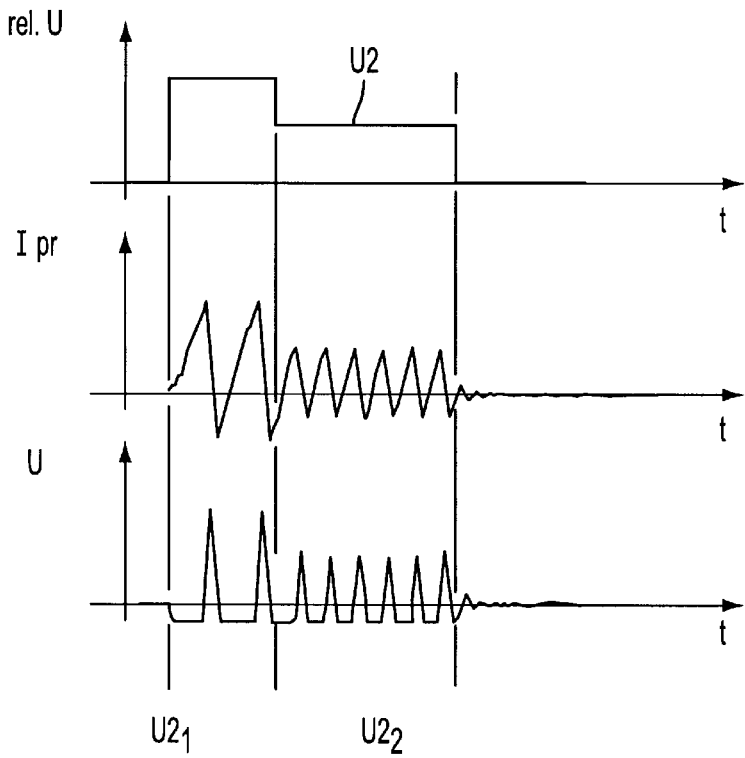
FIG. 2a is a diagrammatic representation of the voltage course at the control input of the alternating current ignition system and the resulting primary coil current as well as the collector voltage at the ignition transistor for the lower partial load operation of the internal combustion engine.

The time-dependent course of the reference voltage U2 or the two reference voltages $U2_1$, and $U2_2$ at the control input SE of the alternating current ignition system for a single ignition operation at the spark plug ZK is outlined diagrammatically in FIG. 2a for the lower partial load operation. The associated time-dependent course of the primary coil current lpr as well as the collector voltage UK of the ignition transistor ZT are outlined below that.

In this case, exactly one ignition operation at one spark plug ZK is shown, wherein the ignition spark is formed from 16 individual current peaks. It can be seen that the high first reference voltage $U2_1$ also leads to high primary coil currents lpr and high collector voltages UK and that the lower second reference voltage $U2_2$ leads to lower primary coil currents lpr and lower collector voltages UK. It can also be seen that the frequency of the alternating current for the alternating current ignition system is proportional to the primary coil current lpr or the reference voltage U2.

The higher the primary coil current lpr, the lower the frequency of the alternating current. This dependence can be compensated, for example, through an adaptation of the capacity of capacitor C1 on the primary side, wherein the switching of the capacity would occur simultaneously with the change in the reference voltage U2 at the control input SE for the alternating current ignition system while the ignition transistor ZT of the alternating current ignition system is blocked in the meantime.

Figure 2B:
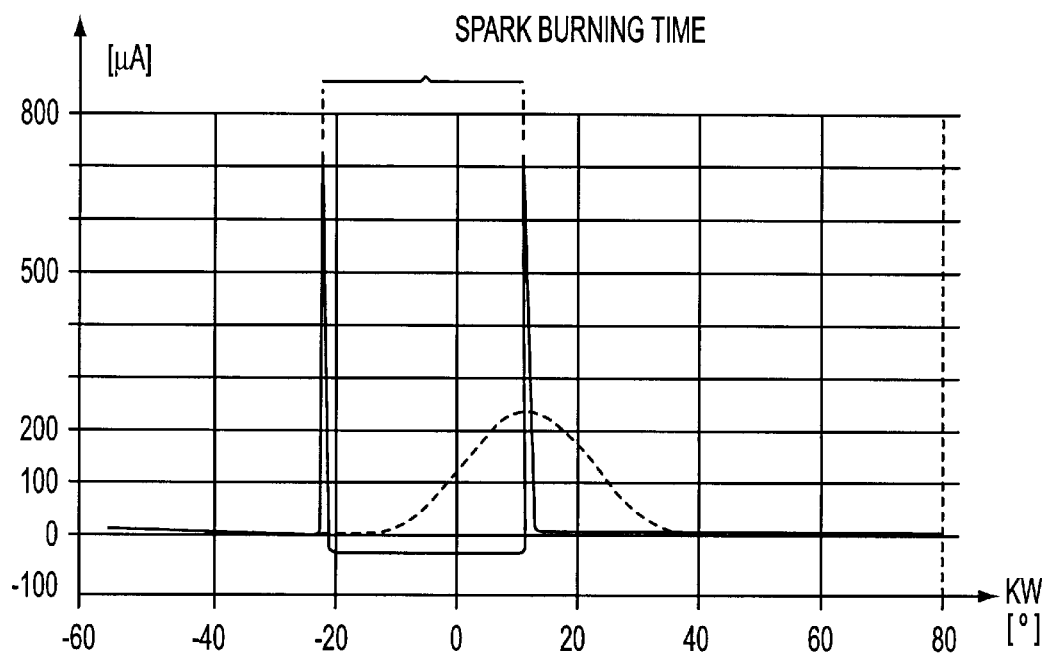
FIG. 2b is a diagrammatic representation of the spark burning time and of a computed ion current signal for the lower partial load operation of the internal combustion engine.

In FIG. 2b, the spark burning time and the resulting (computed) ion current signal for the lower partial load operation is plotted via the crankshaft angle of rotation. In the process, it is revealed that a meaningful ion current measurement to detect knocking combustion cannot be carried out for the required spark burning time.

However, at the end of the spark burning time, the ion current measurement is still used effectively for detecting ignition failures. Whereas during a successful ignition of the fuel-air-mixture, the dying out of the ion current signal is still detected at the end of the spark burning time, an ion current signal cannot be detected if the fuel-air-mixture is not ignited.

In the mean and upper partial load operation, as well as in the full load operation of the internal combustion engine, the throttle valve is opened far enough, so that a high share of the possible fuel-air-mixture flows into the combustion chambers. The combustion chamber pressure development in that case shows high maximum pressures. The fuel-air-mixture furthermore heats up strongly when compressed during the compression cycle, which can result in knocking combustion. The ion current measurement is carried out to detect knocking combustion. In order to be able to carry out a meaningful ion current measurement to detect knocking combustion, the spark burning time must be reduced to a minimum during the operating cycle to ensure a secure ignition of the fuel-air-mixture through the spark plug ZK. The combustion process for the higher partial load operation and the full load operation is influenced by the fact that following the intake cycle, the total gas amount in the combustion chambers contains only a low rate of residual gas from the previous operating cycle, which remains in the combustion chambers.

Thus, it is sufficient to provide a short, intensive ignition spark for a reliable ignition of the fuel mixture. For this, the control input SE of the alternating current ignition system is triggered by the control device SG with a high reference voltage $U2_1$, to which level the voltage U1 which drops at the measuring resistor MW must rise before the comparator K of the alternating current ignition system detects that U1 and U2 are equal and the ignition transistor ZT is closed. In the process, a high primary coil current lpr flows through the ignition coil ZS and induces a high secondary coil voltage of approximately 30000 Volt in its secondary circuit, as a result of which the ignition energy of the ignition spark for spark plug ZK is high. The control input SE of the alternating current ignition system is triggered after only one amplitude with a reference voltage $U2_1$ of zero volt. As a result, the ignition spark dies at the spark plug ZK. Immediately following the end of the ignition process, an alternating current with a frequency that has been adapted for the ion current measurement is generated on the primary side of the ignition coil ZS.

For example, the frequency of the primary-side oscillating circuit is increased by reducing the capacity of the oscillating circuit for the alternating current ignition system. The amplitude of the secondary-side alternating current is configured such that it cannot result in an ignition spark on the secondary side, e.g. for 1 kV. The supply voltage $U_v$ can for this be switched on the primary side to 12 Volt, for example, or to a different voltage $U_B$ that is available from the vehicle electrical system. On the secondary side, the alternating current effects a current flowing over the ionized ignition spark gap. In this case, fluctuations in the combustion chamber pressure development will cause changes in the ion current, which in turn result in an amplitude modulation of the secondary-side alternating current.

The frequency gap between the alternating voltage generated for the ion current measurement and the frequency spectrum of the ion current signal should be as large as possible, since this makes it easier to decouple the ion current signal from the amplitude-modulated alternating current. Given a standard knocking spectrum of 8–18 kHz, the frequency of the alternating voltage generated for the ion current measurement should be 50–100 kHz.

Moreover, it is possible to use a low-pass filter for a simple decoupling of the ion current signal from the alternating voltage generated for the ion current measurement.

Figure 3A:
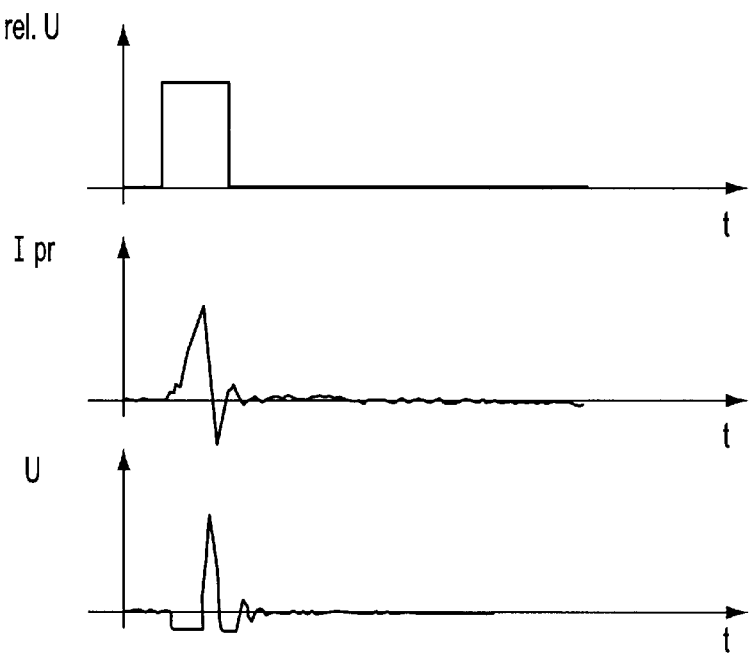
FIG. 3a is a diagrammatic representation of the voltage development at the control input of the alternating current ignition system and the resulting primary coil current as well as the collector voltage at the ignition transistor for the full load operation of the internal combustion engine.

The time-dependent course of the reference voltage U2 at the control input SE of the alternating current ignition system is outlined diagrammatically in FIG. 3a for a single ignition process at a spark plug ZK and during the fill load operation. The associated time-dependent course of the primary coil current lpr, as well as the collector voltage UK of the ignition transistor ZT is outlined below this.

Exactly one ignition process at one spark plug ZK is shown here, wherein the ignition spark is formed from 2 individual current peaks.

Figure 3B:
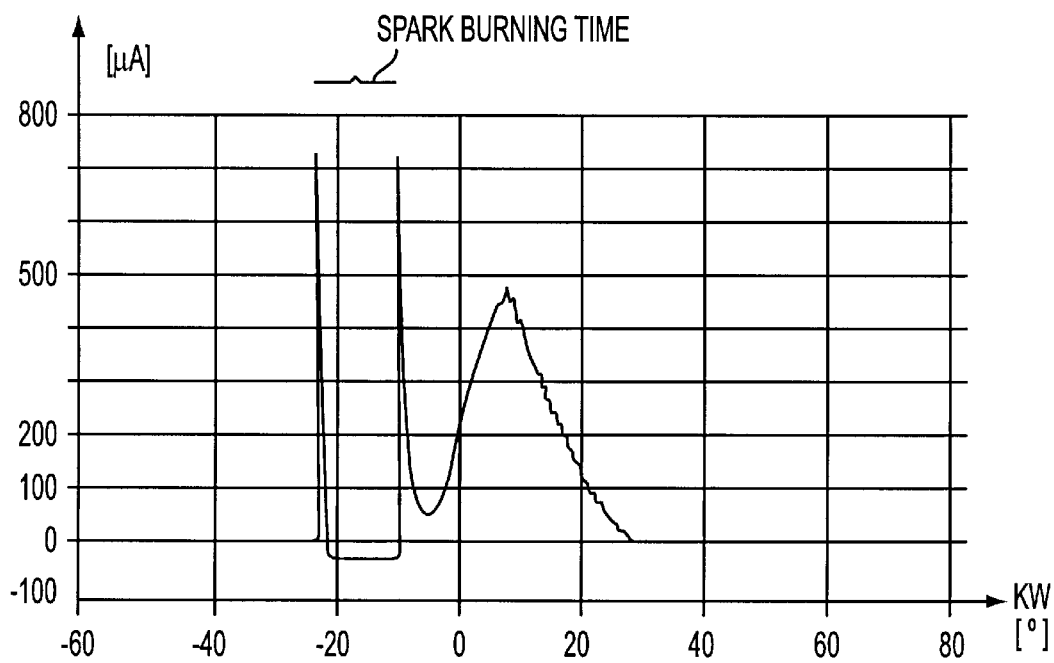
FIG. 3b is a diagrammatic representation of the spark burning time and of a measured ion current signal for the full load operation of the internal combustion engine.

The spark burning time and the measured ion current signal during the full load operation are plotted in FIG. 3b via the crankshaft angle of rotation, which initially confirms the successful ignition of the fuel-air-mixture, the detection of ignition failures. In addition, it can be discerned that a meaningful ion current measurement can be carried out at the end of the short spark burning time. Pressure peaks and fluctuations in the combustion chamber pressure development occur starting with the maximum combustion chamber pressure, which indicates knocking combustion. As a reaction to such a knocking combustion, the point in time for igniting the fuel-air-mixture as a rule moves in the direction of the upper dead center.

The control of the limit value for the primary coil current lpr through a change in the reference voltage U2 at the control input SE of the alternating current ignition system makes it possible to adapt the ignition energy of an ignition spark to the requirements of the combustion process, wherein a different reference value U2 can be specified, if necessary, for each half wave of the alternating voltage generated by the alternating current ignition system for igniting the fuel-air-mixture and wherein this results on the whole in a reduction of the necessary ignition energy. The advantages of this reduction are that the alternating current ignition system requires less current for the same flammability of the fuel. In addition, the load on the electrical supply component of the alternating current ignition system is reduced, as a result of which the electrical supply system can be dimensioned correspondingly smaller and more cost-effectively. Furthermore, the erosion of spark plugs ZK, which increases with long spark burning times, is thereby reduced.

What is claimed is:

1. A method for detecting knocking combustion in an internal combustion engine having an ignition system where a duration of the ignition spark burning time for the spark plug (ZK) is changed in dependence on a load condition of the internal combustion engine, and having an ion current measurement device, which determines pressure development inside the combustion chambers of the internal combustion engine at an end of the spark burning time, said method comprising using an ignition system designed as an alternating current ignition system that provides an alternating ignition voltage, controlling the duration of the ignition spark burning time for the spark plug (ZK) without loss by specifying a number of amplitudes of the alternating ignition voltage necessary for forming an ignition spark at the spark plug (ZK), and changing the ignition energy of the ignition spark for the spark plug (ZK) according to the load condition of the internal combustion engine and other characteristic values made available by the engine.

2. A method according to claim 1, wherein the ignition energy of the ignition spark for spark plug (ZK) is controlled in that, at a control input (SE) of the alternating current ignition system, a comparison is made to determine whether the voltage (U1), which drops at a measuring resistor (MW), is equal to a reference voltage (U2) specified by a control device (SG) for one ignition process of a spark plug (ZK).

3. A method according to claim 1, further including at the end of the spark burning time, carrying out a detection of combustion ignition failures by use of the ion current measurement device.

4. A method according to claim 1, wherein the frequency for the alternating current ignition system is adapted to the requirements for igniting fuel-air-mixture and the ion current measurement.

* * * * *